April 8, 1958

H. E. CIER ET AL 2,830,016

APPARATUS AND METHOD FOR PHOTOCHEMICAL
REACTION OF ORGANIC COMPOUNDS

Filed Sept. 26, 1952

INVENTORS.
Henry G. Schutze,
Harry E. Cier
BY
AGENT

INVENTORS
Henry G. Schutze,
Harry E. Cier
BY

United States Patent Office 2,830,016
Patented Apr. 8, 1958

2,830,016

APPARATUS AND METHOD FOR PHOTOCHEMICAL REACTION OF ORGANIC COMPOUNDS

Harry E. Cier and Henry G. Schutze, Baytown, Tex., assignors, by mesne assignments, to Esso Research and Engineering Company, Elizabeth, N. J., a corporation of Delaware Application September 26, 1952, Serial No. 311,773

13 Claims. (Cl. 204—162)

The present invention is directed to a photochemical reactor. More particularly, the invention is directed to apparatus for conducting photochemical reactions. In its more specific aspects, the invention is directed to photochemical reactions and a method for increasing the amount of product producible therein.

The present invention may be briefly described as a photochemical reactor apparatus which comprises a housing having at least a pair of electrodes arranged within said housing in which electrical conducting means are connected to the electrodes exterior to the housing for supplying electrical current to the electrodes and to provide an arc between the electrodes in the housing. Means are provided in the housing defining at least a path of flow for fluid reactants through the housing outside the geometric center of the arc.

The housing may be provided with a plurality of pairs of electrodes arranged in the housing or the housing may be provided with a plurality of anodes and a common cathode for the anodes. The housing may also be provided with at least a reaction tube defining a path of flow through the housing outside the geometric center of the arc. The reaction tube may be a tubular coil, it may be a U-shaped tube, or it may be a reactor system in which a larger tube surrounds a smaller tube in which the reactants flow inwardly through the smaller tube and outwardly through the annulus between the larger tube and the smaller tube.

The invention also encompasses photochemical reactions of organic compounds in a reaction zone in which the organic compound is exposed to light radiation of an exciting frequency in an arc in the presence of sensitizing agent susceptible to being excited, the particular feature of the present invention being flowing the organic compound through the reaction zone in a path of flow outside the geometric center of the arc.

The organic compound forming a feed stock of the present invention may be a paraffinic hydrocarbon, such as methane, ethane, propane, normal butane, isobutane, normal pentane, isopentane, the hexanes, heptanes, octanes and the higher members of the paraffinic homologous series. Lubricating oil fractions may also be used. As a general statement it may be said that the organic compound may be an organic aliphatic compound and may include straight, branched and cyclic, saturated and unsaturated hydrocarbons, carboxylic acids, alcohols and other organic materials. The organic compound may contain up to about 50 carbon atoms. It is understood, of course, that mixtures of organic compounds, such as mixtures of paraffinic hydrocarbons or the cyclic and unsaturated hydrocarbons, may be employed. Specifically, olefins and aromatics may be used in the reaction. It is also understood that other organic materials as well as the halogenated and other derivatives of the aforementioned compounds may be employed as a feed stock in the present invention.

When the sensitizing agent susceptible to being excited by light radiation of an exciting frequency is a metal, it may be any metal which meets the conditions set out below, including proper vapor pressure, light adsorption characteristics, and energy content in the activated state. Whatever metal sensitizer is employed it is incorporated in the reaction mixture of hydrocarbons, and the mixture is subjected to radiant energy containing frequencies which are capable of energizing the metal sensitizer. In selecting a metal sensitizer and a source of radiant energy for the reaction the following conditions must be met:

(A) The vapor pressure of the metal employed as a sensitizer must be sufficient to insure that metal vapor is present in the hydrocarbon mixture in a concentration sufficient to adsorb the activating light efficiently and to an extent that will permit rapid reaction to take place; conveniently, this vapor pressure is at least 0.001 mm. of mercury at a temperature below about 650° F.

(B) The radiant energy must be of a frequency that can be absorbed by the metallic sensitizer in its ground state in the hydrocarbon mixture. This frequency must correspond to at least one of the resonance lines of the metal sensitizer.

(C) The sum of the energy of the resonance frequency absorbed by the metal sensitizer and of the energy of the metal-hydrogen bond must correspond to an energy content equal to or in excess of that required to rupture one of the desired bonds.

While a number of metal sensitizing agents will fill some of the foregoing requirements, the preferred metal sensitizing agents in carrying out my invention are the metals of Subgroup B of Group II of the Periodic Chart of the Atoms, Revised Edition, 1947, W. F. Meggers, W. M. Welch Mfg. Co., Chicago, Illinois, namely, mercury, cadmium and zinc. While either of these metals may be employed in my process, mercury will be preferred because of its availability, vapor pressure activation energy, and other peculiar properties.

In order to illustrate the resonance line of the metallic sensitizers suitable for practice in the present invention, the following table is presented:

*Table I*

| Element | Resonance Lines, A. |
|---|---|
| Hg | 2,537 <br> 1,850 |
| Cd | 3,261 <br> 2,289 |
| Zn | 3,076 <br> 2,139 |

Sensitizing agents other than metals may be used. For example, chlorine may be used as a sensitizing agent in the sulfochlorination of hydrocarbons. In general halogens may be used as sensitizing agents in the sulfohalogenation of hydrocarbons. Carbonyl compounds such as acetone may also be used as sensitizing agents.

The reaction may be conducted at a temperature in the range from about 80° to 650° F. and pressures may be substantially atmospheric and ranging upwardly therefrom. The temperature and pressure within the range given will be selected to provide a vapor phase and/or for maintenance of liquid phase, if desired.

The invention will be further illustrated by reference to the drawing in which

Figure 1:
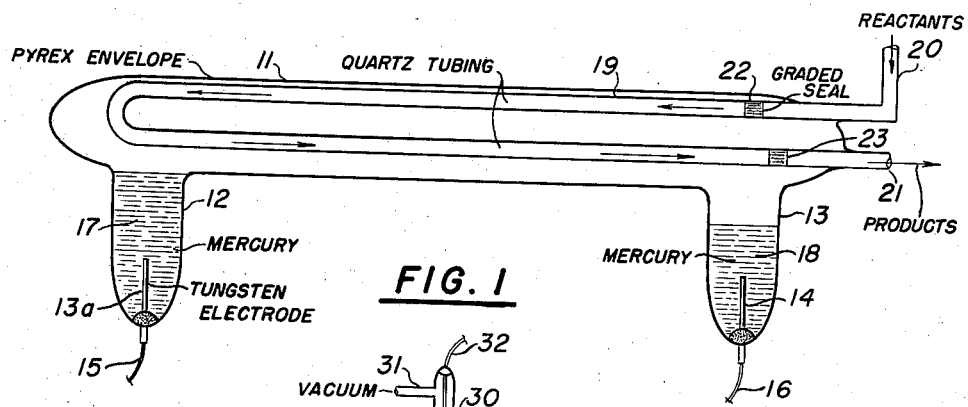
Fig. 1 is a sectional view of an apparatus in accordance with our invention embodying a U-shaped reaction tube.

Referring now to the drawing, identical numerals being employed to designate identical parts, numeral 11 designates a housing for the apparatus of our invention which may be a Pyrex envelope provided with vertically depending electrode legs 12 and 13 in which are arranged tungsten electrodes 13a and 14 which are connected exteriorly to the housing with electrical conducting means 15 and 16, respectively. The electrodes 13a and 14 are immersed in legs 12 and 13 in a body or pools of mercury 17 and 18. Arranged within the housing 11 in the horizontal portion thereof is a quartz U-shaped tubing 19 which has an inlet 20 and an outlet 21. The tubing 19 is constructed of quartz but is connected by graded seals 22 and 23 to the inlet 20 and the outlet 21, respectively, which are constructed of Pyrex.

Figure 2:
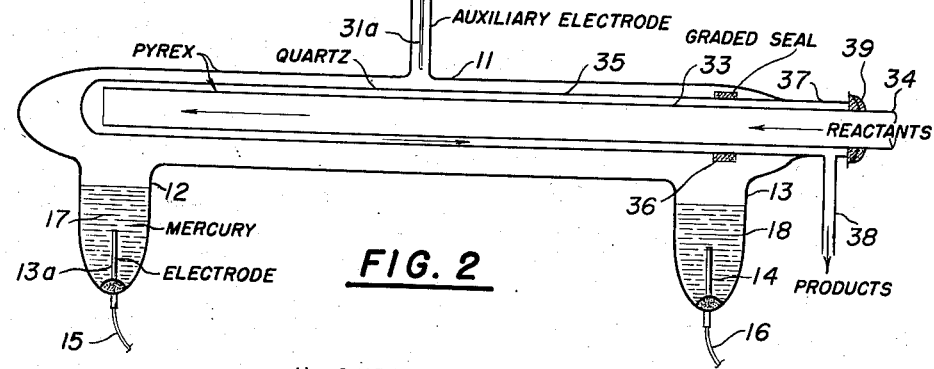
Fig. 2 is a modification of Fig. 1 in which concentric reaction tubes are employed.

Referring now to Fig. 2 the housing 11 is provided with an auxiliary connection 30 to which is a T-shaped conduit 31 by way of which the housing 11 may be connected to a source of low pressure. In order to insure proper conditions in the housing 11 an auxiliary electrode 31a is arranged in the connection 30 and is connected by electrical conducting means 32 to a source of electrical energy. Arranged within the housing 11 of Fig. 2 is a tube 33 having an inlet 34 by way of which reactants are introduced. The tube 33 is arranged concentrically within a larger tube 35 in the housing 11. The tube 35 is constructed of quartz while the tube 33 is constructed of Pyrex. Tube 35 is connected by graded seal 36 to an outlet end 37 which is constructed of Pyrex and which is provided with an outlet line 38. The tubes 33 and 35, including the outlet end 37 of tube 35, may be held together or sealed by sealing means 39.

Figure 3:
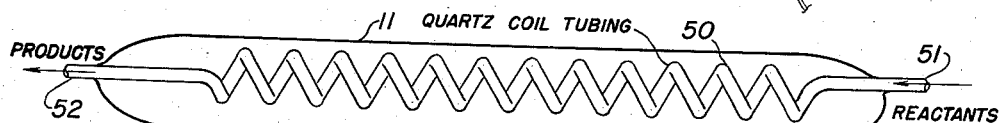
Fig. 3 is a further modification of the apparatus of our invention in which a tubular coil reaction tube is provided.

In Fig. 3 of our invention, the housing 11 has arranged therein a quartz tubular coil 50 which is provided with an inlet 51 and an outlet 52 outside of the housing 11. In other aspects, the apparatus of Fig. 3 is identical to that of Fig. 1.

Figure 4:
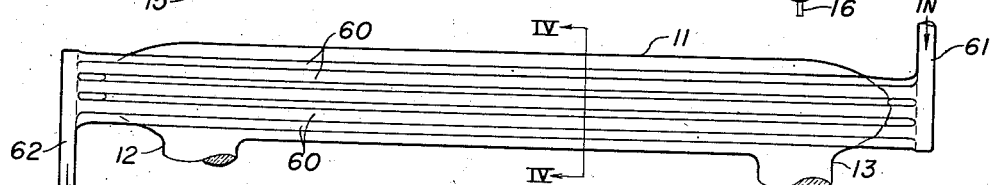
Fig. 4 is a view similar to Figs. 1 to 3 of a modification in which a plurality of reaction tubes are employed.

Referring now to Fig. 4 the housing 11 is provided with a plurality of reaction tubes 60 through which reactants may be introduced by way of manifold 61 and products withdrawn by way of manifold 62.

Figure 5:
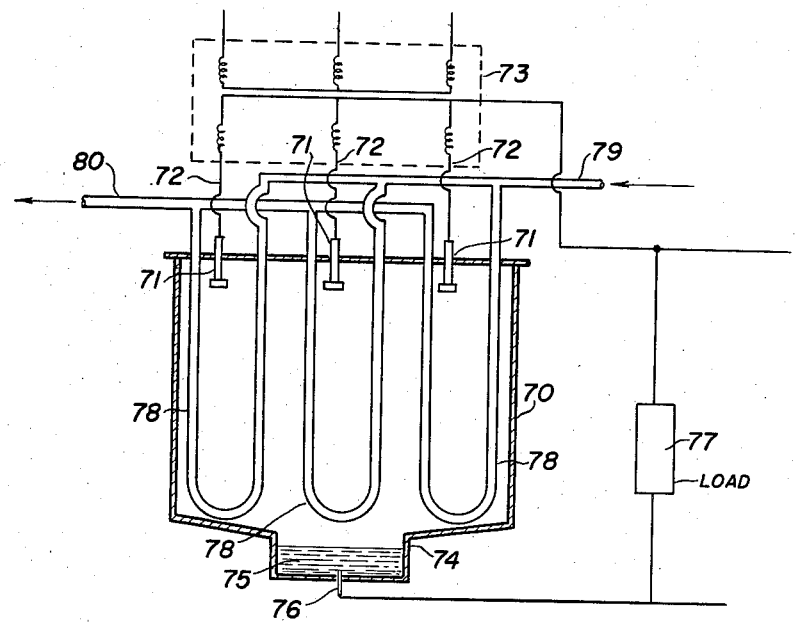
Fig. 5 is a sectional view of an apparatus in accordance with our invention embodying a plurality of reaction tubes and a plurality of anodes with a common cathode.

Referring now to Fig. 5 a housing 70 is provided with a plurality of spaced apart anodes 71 which are connected by electrical conducting means 72 with a rectifying circuit generally indicated as 73. A description of the rectifying circuit may be found in Marti and Winograd, "Mercury Arc Power Rectifiers," Theory and Practice, First Edition, Fourth Impression, McGraw-Hill Book Company, Inc., New York, in which a complete description and operation of said rectifiers may be found. The housing 70 is provided with a leg 74 in which is arranged a pool of mercury 75 which serves as a common cathode for the anodes 71. The cathode 75 is connected by electrical conducting means 76 to the rectifying circuit 73 which contains a load 77. Arranged within the housing 70 is a plurality of U-shaped reaction tubes 78 which are interconnected by an inlet manifold 79 and an outlet manifold 80 such that a reactant may be introduced in parallel through the reaction tubes 78 and product withdrawn in parallel therefrom.

Figure 6:
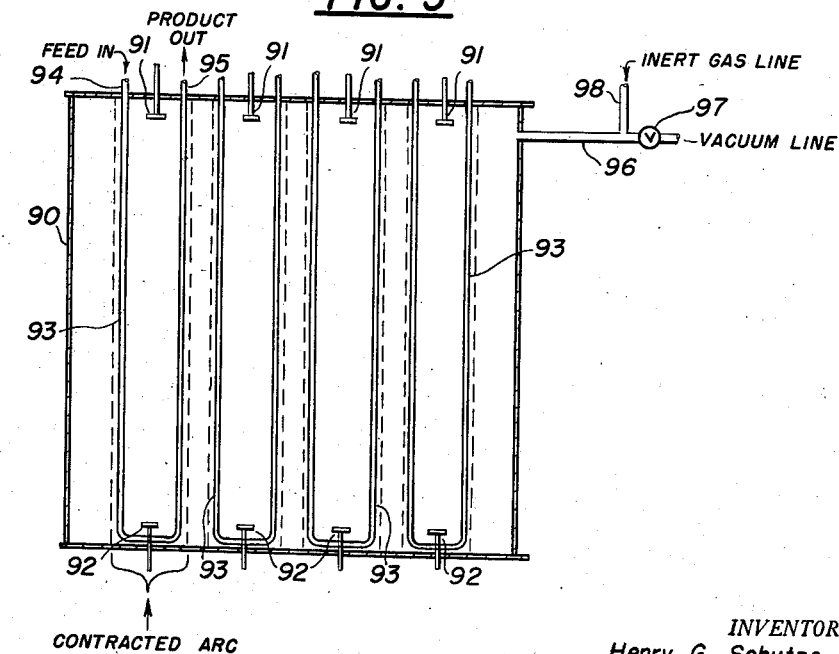
Fig. 6 is a further modification of our apparatus similar to Fig. 5 illustrating apparatus with a plurality of pairs of electrodes.

In the embodiment of our apparatus shown in Fig. 6 a housing 90 has arranged therein a plurality of spaced apart anodes 91 and cathodes 92. The anodes 91 may be similar to the anodes 71 of the appartus of Fig. 5 while the cathodes 92 may be conventional cathodes or may include a mercury leg. Arranged within the housing 90 is a plurality of U-shaped reaction tubes 93 which may similarly be interconnected by a common manifold like the apparatus of Fig. 5 or the feed may be introduced individually through one reaction tube 93 through an inlet 94 and withdrawn through outlet 95 while a different feed may be introduced through the other reaction tubes, if desired. It will be preferable, however, to have the reaction tubes 93 interconnected by manifolds to introduce the feed in parallel therethrough and to withdraw the product in parallel therefrom.

In order to provide the necessary low pressure in the housing 90, a conduit 96 is provided communicating to a source of low pressure. The conduit 96 has a valve 97 for control of the pressure. Also the conduit 96 is provided with a branch line 98 by way of which a suitable inert gas may be introduced into the housing 90.

Figure 7:
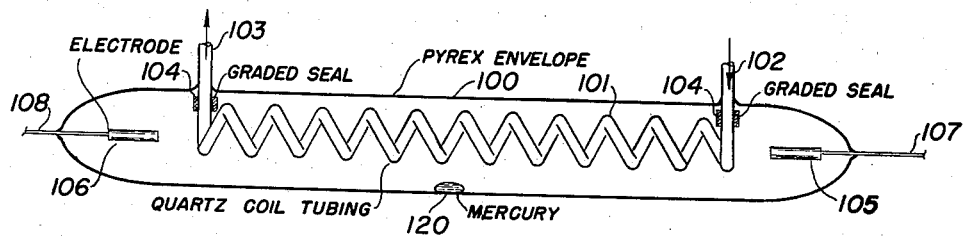
Fig. 7 is a modification of our apparatus employing oxide coated electrodes in the absence of a mercury pool.

Fig. 7 presents an aspect of our invention in which the pool of mercury is dispensed with and a barium-strontium oxide coated electrode is employed. Referring to Fig. 7 a reaction vessel 100 is provided with a helical coil 101 having an inlet 102 and an outlet 103. The helical coil 101 is constructed suitably of quartz while the inlet 102 and outlet 103 may suitably be constructed of Pyrex glass. Likewise the envelope 100 may be constructed of Pyrex. The inlet 102 and the outlet 103 are connected to the quartz tube 101, respectively, by graded seals 104.

Arranged at opposite ends of the horizontal envelope 100 are barium-strontium oxide coated electrodes 105 and 106 which are connected, respectively, by electrical connecting means 107 and 108 to a suitable source of electrical energy.

Figure 8:
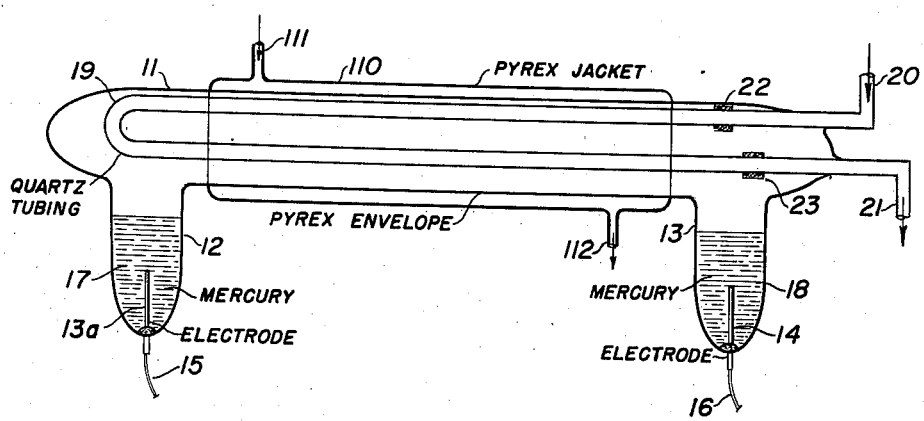
Fig. 8 is a view of an apparatus in accordance with our invention which has an additional reactor around the exterior of the lamp envelope.

Referring now to Fig. 8, it will be seen that the device of Fig. 8 is generally similar to the device of Fig. 1 with the exception that an additional reactor has been placed around the exterior of the lamp envelope. Referring now to Fig. 8 in which identical numerals will be employed to designate identical parts to that of Fig. 1, it will be seen that numeral 11 with respect to Fig. 8 designates a housing or lamp envelope suitably constructed of Pyrex glass having vertically depending electrode legs 12 and 13 in which are arranged tungsten electrodes 13a and 14 which are connected, exteriorly to the housing, with electrical conducting means 15 and 16, respectively. The electrodes 13a and 14 are immersed in legs 12 and 13 in a body of mercury 17 and 18. In the housing 11 a quartz U-shaped reaction tube 19 having an inlet 20 and an outlet 21 is arranged with the inlet 20 and the outlet 21 connected to the tube 19 by graded seals 22 and 23.

The housing 11 is surrounded by a concentric jacket 110 which suitably is constructed of Pyrex and which is provided with an inlet 111 and an outlet 112.

The various embodiments of our invention are provided to establish in the housing of the reaction apparatus a contracted arc between spaced apart electrodes. The reaction tube is arranged in the plasma of the housing in accordance with our invention but is so arranged that all of the reaction tube is not in the contracted arc. Stating this another way, the reaction tube is arranged in the housing to provide a path of flow for fluid reactants through the housing outside the geometric center of the contracted arc.

The construction of the apparatus in accordance with our invention for photochemical reactions is simple. A housing may be constructed from a tube of appropriate length and diameter by having an electrode sealed in one end of the tube with a small exhaust port sealed near this and a male ground glass tapered joint sealed on the other end. Through the female taper joint the ends of the U-tube and an electrode may be sealed. In operation, the U-tube is placed in the housing and sealed by the ground glass tapered joint. The lamp is then evacuated, mercury pressure and inert gas pressure, such as neon or krypton, are adjusted and the lamp is then ready for firing by energizing with a suitable electric current. Such a lamp as has been described allows it to be disassembled readily for cleaning, if necessary. However, with our improved apparatus with the path of flow defined by the reaction tube arranged in the plasma of the lamp outside the geometric center of the arc, cleaning is minimized.

It is preferred that no reactor shall extend into the arc more than 25% of its (the arc's) diameter. The annular area of the arc defined by the diameter of the arc and 75% of the diameter of the arc may be completely or partially filled with the reactor or reactors. Reactors may be provided so that they are partially or entirely covered by the arc with the only limitation being that they cannot penetrate deeper into the arc than the outer 25% annular area.

A reaction apparatus was constructed in accordance with the device of Fig. 1 in which a U-shaped reaction tube was provided. The tube 19 had an internal diameter of 10 mm. while the housing 11 had an internal diameter of 50 mm. The tube 19 was arranged in the housing 11 about 10 mm. from the center of the contracted arc which resulted when energizing the electrodes 13a and 14.

A reaction apparatus was also constructed in accordance with the device of Fig. 2. The tube 33 had an internal diameter of 8.5 mm., tube 35 had an internal diameter of 19.5 mm., and housing 11 had an internal diameter of 34 mm. The thickness of the walls for each tube was 1 mm.

Our apparatus may be employed using other types of metals besides mercury, for example, cadmium and sodium. Our improved apparatus has the advantages over the prior art apparatus of increased efficiency, less self reversal and higher intensity of radiation. Another feature of our apparatus is that turbulent flow conditions may be obtained in the reaction tube through which the path of flow is outside the geometric center of the arc.

In order to illustrate the advantages of our invention, three different photochemical reactors were constructed. The first of these was the conventional apparatus which places the lamp inside the reactor. The second was constructed in accordance with Fig. 1 and embodied a U-shaped tube in which a path of flow was provided outside the geometric center of the contracted arc. The third embodied a feed inlet tube placed concentrically within the reactant tube. The common center line of the feed and reactant tubes was made to coincide with the center line of the contracted arc. Normal butane containing mercury vapor as a sensitizing agent was passed through each of the reactors for one hour. The results of these runs are shown in Table II:

*Table II*

| Reactor System Description | A Conventional Reactor | B U-Bend Reactor outside Geometric Center of Arc | C Concentric Tube Reactor at Geometric Center of Arc |
|---|---|---|---|
| Reaction Temperature, °F | 242-252 | 250-300 | [1] 300-350 |
| Power, Watts | 15 | 825 | 3,075 |
| Power Ratio, $\frac{B \text{ or } C}{A}$ | 1 | 55 | 204 |
| Liquid Product Ratio, $\frac{B \text{ or } C}{A}$ | 1 | 70 | 7.5 |

[1] Estimated.

From the data presented in the foregoing table, it will be plainly apparent that the reactor B gave improved results over either reactor A or C. In spite of the much larger power input to reactor C only about ⅛ the amount of product was obtained as in reactor B. Comparing reactor B with reactor A, it will be seen that 70 times the amount of product was obtained in reactor B than in reactor A. Also it will be noteworthy that reactor B although not providing as much power as reactor C gives substantially improved results over reactor C and provides the obtaining of a substantially larger amount of power than reactor A.

Our invention may be employed in other photochemical reactions besides those specifically illustrated. For example, photochemical reactions of the chain type, such as sulfo-halogenation of a paraffinic hydrocarbon, such as normal heptane, with sulfur dioxide and chlorine may be employed. Non-metallic sensitizers are characteristically used with reactions of this type. In some of the reactions the sensitizer may be one of the reactants, such as in the reaction of chlorine, sulfur dioxide, and normal heptane to effect the sulfochlorination of normal heptane.

In conducting our invention, it will be desirable to provide in the reaction system a sensitizer of the type illustrated. Also it will be desirable that the reactant feed be saturated with the sensitizer prior to passage through the reaction tube which is exposed to radiation of an exciting frequency in the contracted arc although the sensitizer may be added by other means, such as separately to the reactor. The housing in which the electrodes are arranged and through which the reaction tube passes may have a suitable inert gas, such as neon, argon, kryton, and xenon, introduced thereto and the internal pressure adjusted to the proper level to provide a contracted arc between the electrodes on energizing the electrodes.

In operating the devices of Figs. 1 to 4, the reactants such as, for example, butane saturated with mercury, may be passed through the inlet 20 with respect to Fig. 1 and through the tube 19 which passes outside the geometric center of the arc between the electrodes 13 and 14 resulting from energization of the conducting means 15 and 16. The products issue from the tubes 19 by the outlet 21. In the embodiment of Fig. 2 the reactant, such as butane saturated with mercury, is introduced by inlet 34 and flows in the path indicated by the arrows which is outside the geometric center of the contracted arc between the electrodes 13a and 14. The products which will include octanes of a branched nature may be withdrawn by line 38. In the device of Fig. 3 the feed, such as butane saturated with mercury, is introduced through line 51 and passes through coil 50 to outlet 52. The coil 50 is arranged outside the geometric center of the contracted arc between electrodes 13 and 14.

Figure 4A:
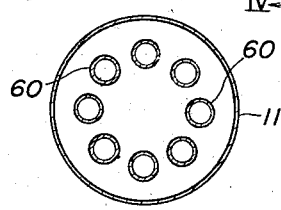
Fig. 4a is a view taken along the lines IV—IV of Fig. 4.

Similarly, with respect to Figs. 4 and 4a, a hydrocarbon saturated with normal butane, for example, may be introduced through manifold 61 and flowed through the tubes 60 and thence outwardly through manifold 62, the product containing condensed or dimerized hydrocarbon.

With respect to the embodiment of Fig. 5 the tubes 68 may be constructed of material of high fusing point, such as quartz, vycor and the like. A hydrocarbon, such as butane saturated with mercury, may be introduced into manifold 79. It is assumed that the internal chamber defined by the housing 70 will have had its pressure adjusted to a proper level by introducing an inert gas of the type illustrated. A contracted arc is established between the first of the anodes 71 and the cathode 75. For example, alternating potential may be applied through the transformer 73 causing the anodes 71 to discharge in sequence as the potential on each one is increased to a positive value sufficient to cause an arc to be established between the anode and the common cathode 75. Each anode has a sinusoidal potential applied to it and, therefore, it can discharge only during that portion of the cycle in which the anode is positive and at a sufficiently high voltage to break down the resistance of the atmosphere between it and the cathode 75. A similar situation obtains for the remaining anodes 71. The characteristics of a three-phase system, such as illustrated in Fig. 5, are such that the sinusoidal waves have a phase separation of 120° F. Because of this phase separation the anodes 71 do not discharge simultaneously since the necessary positive potential does not exist on more than one electrode at a time.

The device of Fig. 6 operates in a similar manner to that of Fig. 1 and further details of such operation need not be given.

The device of Fig. 7 operates similarly to the device of Figs. 1 to 4, the feed or reactant being introduced by inlet 102 and flows through coil 101 and outwardly through outlet 103. A drop of mercury 120 is provided in the envelope 100 for sensitizing the reaction. It is understood that the electrodes 105 and 106 are energized through means 107 and 108 to cause a reaction such as when butane or other hydrocarbon is introduced by inlet 102.

The device of Fig. 8 operates generally similarly to that of Fig. 1 with the exception that higher efficiencies are obtained by providing a flow of reactant through the auxiliary envelope 110. In this particular instance flow will be had through the inlet 20 and also through the inlet 111. It may be desirable to flow the same feed through inlet 20 and through inlet 111 or the product from outlet 21 may be fed into inlet 111 or the product from outlet 112 may be flowed into inlet 20 depending on the reactants being employed and the degree of reaction desired. It will be seen that the embodiment of Fig. 8 is susceptible to being used in many ways and we contemplate that our invention will embrace all modifications to which this embodiment may be put.

In the practice of our invention, the reactants of either of the several embodiments issuing from the reactor may be passed into a stabilizing column such as a suitable precise fractional distillation column wherein unreacted gases or other materials may be removed and liquid product may be collected and recovered. The unreacted material, such as gases, may be recycled to the feed to the photochemical reaction system. The product produced when a hydrocarbon is the feed stock may be used as a constituent of aviation fuel or if the product is a sulfohalogenated product it may suitably be used in chemical synthesis or in preparation of detergent materials and the like.

While we have given specific examples of several types of reactants and specific examples of various reactants, it is apparent that we do not wish to limit ourselves to any particular specific embodiment or mode of operations since the invention is broadly directed to improvement of photochemical reactions by providing a reactor system in which the reactants flow in a path outside the geometric center of a contracted arc in a photochemical reactor of the type illustrated.

The nature and objects of the present invention having been completely described and illustrated, what we wish to claim as new and useful and to secure by Letters Patent is:

1. A photochemical reactor which comprises an elongate housing having at least a pair of electrodes arranged within said housing adjacent opposite ends thereof, electrical conducting means connected to said electrodes exterior to said housing adapted to supply electric current to said electrodes in an amount relative to the length of said housing sufficient to provide a contracted arc of determined dimensions between said electrodes in said housing and means in said housing and offset from the longitudinal axis thereof defining an enclosed path of flow for fluid reactants through said housing, said path of flow being encompassed by at least a portion of the outer 25 percent annular area of said contracted arc of determined dimensions and said means penetrating into said arc no deeper than the outer 25 percent of the diameter thereof.

2. A photochemical reactor which comprises an elongate housing having at least a pair of electrodes arranged within said housing adjacent opposite ends thereof, electrical conducting means connected to said electrodes exterior to said housing adapted to supply electric currrent to said electrodes in an amount relative to the length of said housing sufficient to provide a contracted arc of determined dimensions between said electrodes in said housing and a tubular coil in said housing and offset from the longitudinal axis thereof defining a path of flow for fluid reactants through said housing, said path of flow being encompassed by at least a portion of the outer 25 percent annular area of said contracted arc of determined dimensions and said coil penetrating into said arc no deeper than the outer 25 percent of the diameter thereof.

3. A photochemical reactor which comprises an elongate housing having at least a pair of electrodes arranged within said housing adjacent opposite ends thereof, electrical conducting means connected to said electrodes exterior to said housing adapted to supply electric current to said electrodes in an amount relative to the length of said housing sufficient to provide a contracted arc of determined dimensions between said electrodes in said housing and a U-shaped tube in said housing and offset from the longitudinal axis thereof defining a path of flow for fluid reactants through said housing, said path of flow being encompassed by at least a portion of the outer 25 percent annular area of said contracted arc of determined dimensions and said tube penetrating into said arc no deeper than the outer 25 per cent of the diameter thereof.

4. A photochemical reactor which comprises a horizontally arranged housing having vertically depending legs adjacent first and second ends of the housing, an electrode arranged in each of said legs, electrical conducting means connected to said electrodes exterior to said housing adapted to supply electric current to said electrodes in an amount relative to the length of said housing sufficient to provide a contracted arc of determined dimensions between said electrodes in said housing and means in said housing and offset from the longitudinal axis thereof defining an enclosed path of flow for fluid reactants through said housing, said path of flow being encompassed by at least a portion of the outer 25 percent annular area of said contracted arc of determined dimensions and said means penetrating into said arc no deeper than the outer 25 percent of the diameter thereof.

5. A photochemical reactor which comprises a horizontally arranged housing having vertically depending legs adjacent first and second ends of the housing, an electrode arranged in each of said legs, electrical conducting means connected to said electrodes exterior to said housing adapted to supply electric current to said electrodes in an amount relative to the length of said housing sufficient to provide a contracted arc of determined dimensions between said electrodes in said housing and a tubular coil in said housing and offset from the longitudinal axis thereof defining a path of flow for fluid reactants through said housing, said path of flow being encompassed by at least a portion of the outer 25 percent annular area of said contracted arc of determined dimensions and said tubular coil penetrating into said arc no deeper than the outer 25 percent of the diameter thereof.

6. A photochemical reactor which comprises a horizontally arranged housing having vertically depending legs adjacent first and second ends of the housing, an electrode arranged in each of said legs, electrical conducting means connected to said electrodes exterior to said housing adapted to supply electric current to said electrodes in an amount relative to the length of said housing sufficient to provide a contracted arc of determined dimensions between said electrodes in said housing and a U-shaped tube in said housing and offset from the longitudinal axis thereof defining a path of flow for fluid reactants through said housing, said path of flow being encompassed by at least a portion of the outer 25 percent annular area of said contracted arc of determined dimensions and said tube penetrating into said arc no deeper than the outer 25 percent of the diameter thereof.

7. A photochemical reactor which comprises an elongate housing having a plurality of spaced apart electrodes arranged within said housing adjacent opposite ends thereof, electrical conducting means connected to said electrodes exterior to said housing for supplying electric current to said electrodes in said housing in an amount relative to the length of said housing sufficient to provide a plurality of contracted arcs of determined dimensions in said housing, a plurality of reaction tubes in said housing, each of said reaction tubes having an inlet and an outlet exterior to said housing, said reaction tubes being arranged within said housing to define a plurality of enclosed paths of flow for fluid reactants through said housing, each of said paths of flow being encompassed by at least a portion of the outer 25 percent annular area of one of said contracted arcs and penetrating into said arc no deeper than the outer 25 percent of the diameter thereof.

8. A photochemical reactor which comprises a housing having a plurality of anodes horizontally spaced apart, a common cathode in said housing for said anodes vertically spaced apart from said anodes, electrical conducting means for said anodes and cathode connected to said anodes and cathode exterior to said housing adapted to supply electric current to said anodes and cathode in an amount relative to the length of said housing sufficient to provide contracted arcs of determined dimensions between said anodes and cathode, a plurality of reaction tubes each having an inlet and outlet exterior to said housing arranged within said housing defining a plurality of enclosed paths of flow for fluid reactants through said tubes, each of said paths of flow being encompassed by at least a portion of the outer 25 percent annular area of one of said contracted arcs and penetrating into said arc no deeper than the outer 25 percent of the diameter thereof.

9. In the photochemical reaction of an organic compound in a reaction zone in which the organic compound is exposed to light radiation of an exciting frequency in a contracted arc of determined dimensions, the step of flowing said organic compound through said reaction zone in an enclosed path of flow encompassed by at least a portion of the outer 25 percent annular area of said contracted arc, said path of flow penetrating into said arc no deeper than the outer 25 percent of the diameter thereof.

10. A method in accordance with claim 9 in which the organic compound is a hydrocarbon.

11. A method for reacting an organic compound which comprises exposing said organic compound to light radiation of an exciting frequency in a contracted arc of determined dimensions at a temperature within the range of 80° to 650° F. in a reaction zone in the presence of a sensitizing agent susceptible to being excited by said radiation in an enclosed path of flow in said reaction zone encompassed by at least a portion of the outer 25 percent annular area of said contracted arc, said path of flow penetrating into said arc no deeper than the outer 25 percent of the diameter thereof.

12. A method for reacting a hydrocarbon which comprises establishing in a reaction zone a contracted arc of determined dimensions emitting light radiation of an exciting frequency, exposing said hydrocarbon to said light radiation at a temperature in the range from 80° to 650° F. in the presence of a sensitizing agent susceptible to being excited by said radiation in an enclosed path of flow in said reaction zone to form a product and recovering the product, said path of flow being encompassed by at least a portion of the outer 25 percent annular area of said contracted arc, said path of flow penetrating into said arc no deeper than the outer 25 percent of the diameter thereof.

13. A method as in claim 12 wherein the hydrocarbon is a paraffin.

References Cited in the file of this patent
UNITED STATES PATENTS

| Number | Name | Date |
|---|---|---|
| 1,079,503 | Linker | Nov. 25, 1913 |
| 1,929,910 | Zecher | Oct. 10, 1933 |
| 2,003,898 | Mitscherling | June 4, 1935 |
| 2,056,641 | Zecher | Oct. 6, 1936 |
| 2,097,769 | Mitscherling | Nov. 2, 1937 |
| 2,150,657 | Mitscherling | Mar. 14, 1939 |
| 2,624,101 | Chamberlain et al. | Dec. 30, 1952 |

OTHER REFERENCES

Gaseous Conductors, by Cobine, 1st edition, McGraw-Hill Book Co., Inc., New York, N. Y., pages 291, 300, 318.

Bates et al.: Journal American Chemical Soc., vol. 49, October 1927, pp. 2439–2440.